US010929001B2

(12) United States Patent
Ormand

(10) Patent No.: US 10,929,001 B2
(45) Date of Patent: Feb. 23, 2021

(54) THRESHOLD-BASED DRAGGABLE GESTURE SYSTEM AND METHOD FOR TRIGGERING EVENTS

(71) Applicant: Open Text SA ULC, Halifax (CA)

(72) Inventor: Brad Ormand, Austin, TX (US)

(73) Assignee: Open Text SA ULC, Halifax (CA)

( * ) Notice: Subject to any disclaimer, the term of this patent is extended or adjusted under 35 U.S.C. 154(b) by 0 days.

(21) Appl. No.: 16/518,553

(22) Filed: Jul. 22, 2019

(65) Prior Publication Data

US 2019/0346983 A1 Nov. 14, 2019

Related U.S. Application Data

(63) Continuation of application No. 14/735,750, filed on Jun. 10, 2015, now Pat. No. 10,402,079.

(60) Provisional application No. 62/010,349, filed on Jun. 10, 2014.

(51) Int. Cl.
| | |
|---|---|
| *G06F 3/0485* | (2013.01) |
| *G06F 3/038* | (2013.01) |
| *G06F 3/0484* | (2013.01) |
| *G06F 3/0488* | (2013.01) |
| *G06F 3/041* | (2006.01) |
| *G06F 3/0483* | (2013.01) |

(Continued)

(52) U.S. Cl.
CPC ............ *G06F 3/0485* (2013.01); *G06F 3/017* (2013.01); *G06F 3/038* (2013.01); *G06F 3/0416* (2013.01); *G06F 3/0483* (2013.01); *G06F 3/0484* (2013.01); *G06F 3/0487* (2013.01); *G06F 3/0488* (2013.01); *G06F 3/04883* (2013.01)

(58) Field of Classification Search
CPC .............................. G06F 3/0485; G06F 3/038
See application file for complete search history.

(56) References Cited

U.S. PATENT DOCUMENTS

| | | |
|---|---|---|
| 10,402,079 B2 | 9/2019 | Ormand |
| 2004/0122971 A1 | 6/2004 | Joshi |
| 2008/0168404 A1 | 6/2008 | Ording |

(Continued)

OTHER PUBLICATIONS

Office Action for U.S. Appl. No. 14/735,750, dated Mar. 29, 2017, 20 pgs.

(Continued)

*Primary Examiner* — Ryan Barrett
(74) *Attorney, Agent, or Firm* — Sprinkle IP Law Group

(57) ABSTRACT

A novel approach to displaying content on user devices may include initializing a gesture-to-refresh functionality with a view of a page of a non-native application running on a client device. The non-native application can be platform-independent. Each page of the non-native application can have its own gesture-to-refresh functionality. User gesture events such as touch or mouse events relative to the view presented on a display of the client device are continuously monitored by the gesture-to-refresh functionality which detects and tracks the view when dragged by a dragging gesture from a first position to a second position on the display. The view is refreshed when the second position of the view reaches or exceeds a predetermined threshold. The view is allowed to return to the first position upon release of the dragging gesture when the second position of the view is less than the predetermined threshold.

20 Claims, 4 Drawing Sheets

(51) Int. Cl.
*G06F 3/01* (2006.01)
*G06F 3/0487* (2013.01)

(56) References Cited

U.S. PATENT DOCUMENTS

| | | |
|---|---|---|
| 2008/0320050 A1 | 12/2008 | Chan |
| 2010/0199180 A1 | 8/2010 | Brichter |
| 2012/0166954 A1 | 6/2012 | Roth |
| 2013/0226554 A1 | 8/2013 | Dillard |
| 2013/0311919 A1 | 11/2013 | Faidy |
| 2014/0143688 A1 | 5/2014 | Hou |
| 2014/0237356 A1* | 8/2014 | Durga ............... G06F 3/0233 715/256 |
| 2014/0282272 A1 | 9/2014 | Kies |
| 2014/0365956 A1 | 12/2014 | Karunamuni |
| 2015/0193117 A1 | 7/2015 | Nicolaou |
| 2015/0213487 A1 | 7/2015 | Nwosu |
| 2015/0355806 A1 | 12/2015 | Ormand |
| 2016/0117068 A1 | 4/2016 | Greenberg |

OTHER PUBLICATIONS

Calore, "iPhone 'Pull to Refresh' in JavaScript," Aug. 2, 2010, at https://www.wired.com/2010/08/iphone-pull-to-refresh-in-javascript/.

Gordon, "Add the Pull to Refresh Gesture to Chrome and Safari with This Extension," Dec. 5, 2011, at http://lifehacker.com/5865332/add-the-pull-to-refresh-gesture-to-chrome-and-safari-with-this-extension.

Carr, "Why the Pull-To-Refresh Gesture Must Die," Dec. 20, 2013, at https://www.fastcodesign.com/3023421/why-the-pull-to-refresh-gesture-must-die.

Office Action for U.S. Appl. No. 14/735,750, dated Oct. 10, 2017, 23 pgs.

Bovell, "Understand JavaScript Callback Functions and Use Them," Mar. 4, 2013, at http://javascriptissexy.com/understand-javascript-callback-functions-and-use-them/.

Takada, "Single page apps in depth," Jul. 1, 2012, at https://web.archive.org/web/20120701021821/http://singlepageappbook.com/single-page.html.

View-source:http://waynepan.com/s/pull/, 3 pgs., printed Jan. 10, 2018.

http://waynepan.com/s/pull/pull, 2 pgs., printed Jan. 10, 2018.

Office Action for U.S. Appl. No. 14/735,750, dated Dec. 3, 2018, 26 pgs.

Krishna, "Hard-coding and Soft-coding," http://thoughtclusters.com/2007/08/hard-coding-and-soft-coding, dated Aug. 4, 2007, 6 pages.

Pan, "JavaScript Pull to Refresh," http://waynepan.com/2010/07/30/javascript-pull-to-refresh, dated Jul. 30, 2010, 4 pages.

Notice of Allowance for U.S. Appl. No. 14/735,750, dated Apr. 19, 2019, 6 pgs.

Perez, "Oh, That "Pull to Refresh" Thing in iOS? Yeah, Twitter Has a Patent App on That," https://techcrunch.com/2012/03/27/pull-to-refresh-the-patent, dated Mar. 27, 2012, 4 pages.

* cited by examiner

THRESHOLD-BASED DRAGGABLE GESTURE SYSTEM AND METHOD FOR TRIGGERING EVENTS

CROSS-REFERENCE TO RELATED APPLICATIONS

This application is a continuation of, and claims a benefit of priority under 35 U.S.C. § 120 from, U.S. patent application Ser. No. 14/735,750, filed Jun. 10, 2015, entitled "THRESHOLD-BASED DRAGGABLE GESTURE SYSTEM AND METHOD FOR TRIGGERING EVENTS," issued as U.S. Pat. No. 10,402,079, which claims a benefit of priority under 35 U.S.C. § 119(e) from U.S. Provisional Application No. 62/010,349, filed Jun. 10, 2014, entitled "THRESHOLD-BASED DRAGGABLE GESTURE SYSTEM AND METHOD FOR TRIGGERING EVENTS," both of which are fully incorporated by reference herein for all purposes.

TECHNICAL FIELD

This disclosure relates generally to software user interfaces. More particularly, embodiments disclosed herein relate to systems, methods, and computer program products for any user interface which, by mouse, finger, stylus, pointing device or other "dragging" device, a user's gesture or position is measured against a threshold mark over time to thereby trigger events.

BACKGROUND

In native mobile touch application developments such as those for iPhone and Android devices, user interface (UI) software development kits (SDKs) have been developed to give users the ability to pull down to refresh or reload a view of a page on mobile devices using their fingers and/or styluses. Mobile device users are used to native mobile applications having this pull-down-to-refresh functionality. However, this pull-down-to-refresh functionality does not exist in desktop applications, web-based applications, and mobile applications that are not written in the native code.

Applications that are not written in native mobile touch application developments may implement certain traditional approaches to displaying content on a mobile device. These traditional approaches have their drawbacks. For example, to manage a view pull, one traditional approach involves "hijacking" the natural scrolling behavior of the entire content area and making the process of scrolling manual. Traditional approaches like this can be very intrusive to the process of scrolling itself and expensive for central processing unit (CPU) cycle reasons, particularly since there is already a natural browser mechanism to control how content is refreshed.

Other traditional approaches do not work well in a "dynamic page" environment. With such traditional approaches, all of the JavaScript and HyperText Markup Language (HTML) of an application are loaded upfront. When there is a need to go to another section of the application, a state is changed to show or hide content. The application does not perform another page load or refresh content. Yet other traditional approaches to displaying content on a mobile device are not hospitable to "app-like" designs.

In view of the foregoing, there is room for innovations and improvements to displaying content on user devices.

SUMMARY OF THE DISCLOSURE

Accordingly, it is an object of the invention to provide a threshold-based draggable gesture system and method for triggering events in an application not necessarily native to a mobile device. In some embodiments, this object can be realized in a web-page-based, gesture system configured for dynamic, single-loaded-html-page environments. In some embodiments, the system may be implemented as a user interface module running on a client device.

In some embodiments, the user interface module may implement a method comprising initializing a gesture-to-refresh functionality such as a pull down functionality on a client device. Examples of a suitable client device may include, but are not limited to, a mobile device, a smart phone, or a tablet computer.

The method may further comprise monitoring gesture events such as touch event, mouse-down events, pointing-device events, etc. This monitoring may be performed continuously such that when a predetermined user input such as a certain gesture (e.g., drag down, drag left, drag right, pull up, etc.) is detected, the movement of the user gesture (which is referred to herein as a gesture event) can be tracked and compared to a predefined threshold. The method may comprise determining whether such a user gesture amounts to an indication that the content should be refreshed and, if so (e.g., all conditions are met), performing predetermined animations, and calling an inputted work function.

One embodiment comprises a system comprising a processor and a non-transitory computer-readable storage medium that stores computer instructions translatable by the processor to perform a method substantially as described herein. Another embodiment comprises a computer program product having a non-transitory computer-readable storage medium that stores computer instructions translatable by a processor to perform a method substantially as described herein.

Numerous other embodiments are also possible.

Embodiments disclosed herein can provide many advantages. For example, with embodiments disclosed herein, application developers can develop non-native applications such as web and/or mobile applications with JavaScript, Cascading Style Sheets (CSS), and HTML and have them behave in a manner intuitively akin to what users are expecting from native applications. It can save money and time by only having to write code for a particular platform once and deploy in multiple places/devices.

These, and other, aspects of the disclosure will be better appreciated and understood when considered in conjunction with the following description and the accompanying drawings. It should be understood, however, that the following description, while indicating various embodiments of the disclosure and numerous specific details thereof, is given by way of illustration and not of limitation. Many substitutions, modifications, additions and/or rearrangements may be made within the scope of the disclosure without departing from the spirit thereof, and the disclosure includes all such substitutions, modifications, additions and/or rearrangements.

BRIEF DESCRIPTION OF THE DRAWINGS

The drawings accompanying and forming part of this specification are included to depict certain aspects of the invention. A clearer impression of the invention, and of the components and operation of systems provided with the invention, will become more readily apparent by referring to the exemplary, and therefore non-limiting, embodiments illustrated in the drawings in which like reference numbers indicate like features and wherein.

DETAILED DESCRIPTION

The invention and the various features and advantageous details thereof are explained more fully with reference to the non-limiting embodiments that are illustrated in the accompanying drawings and detailed in the following description. Descriptions of well-known starting materials, processing techniques, components and equipment are omitted so as not to unnecessarily obscure the invention in detail. It should be understood, however, that the detailed description and the specific examples, while indicating some embodiments of the invention, are given by way of illustration only and not by way of limitation. Various substitutions, modifications, additions and/or rearrangements within the spirit and/or scope of the underlying inventive concept will become apparent to those skilled in the art from this disclosure.

Figure 1:
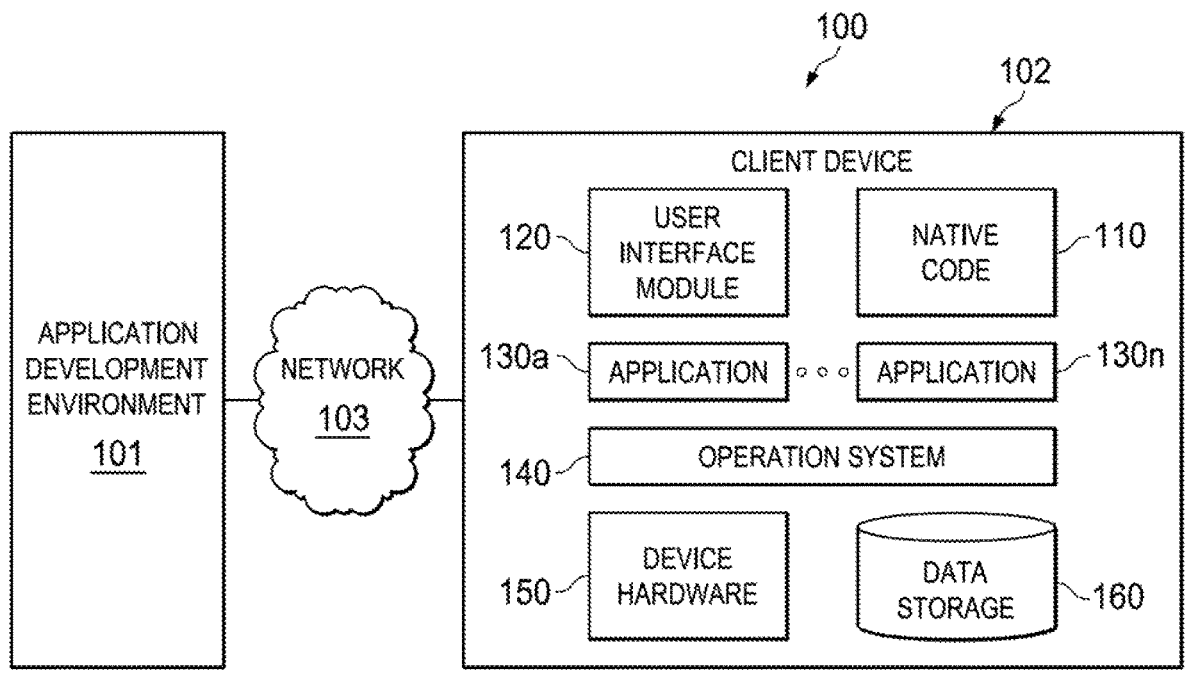
FIG. 1 depicts a diagrammatic representation of one example of a system operating in a network environment according to some embodiments disclosed herein.

FIG. 1 depicts a diagrammatic representation of one example of a system operating in a network environment according to some embodiments disclosed herein. System 100 may include client device 102 coupled to server 101 over network 103. A mobile device such as a smartphone can be an example of client device 102. Additional examples may include, but are not limited to, tablet computers, laptop computers, handheld devices, mobile devices, personal digital assistants, enterprise digital assistants, etc.

Client device 102 may include native code 110, user interface 120, non-native applications 130a . . . 130n, operating system 140, device hardware 150, and data storage 160. Native code refers to computer programming (code) compiled to run on a specific processor and its set of instructions. In other words, native code 110 is platform-dependent. The term platform can refer to the type of processor and/or other hardware on which a given operating system or application runs, the type of operating system on a computer or the combination of the type of hardware and the type of operating system running on it. An example of native code can be a mobile application specifically written to run on a particular type of smartphone having a particular operating system.

Client device 102 may also include one or more non-native applications 130a . . . 130n that are not written in native code. Applications 130a . . . 130n can be platform-independent. An example of a non-native application can be a web application. A web application refers to software that runs in a web browser or is created in a browser supported programming language such as JavaScript, HTML, CSS, etc. A web application relies on a web browser to render the application and may access application files stored on remote server(s) such as server 101 shown in FIG. 1. To this end, a web browser can be considered a client of server 101. Depending upon implementation, a web browser can be a thin or thick client. In some cases, client device 102 may retrieve one or more web applications from server 101 and/or from an electronic application store on the Internet.

Web applications typically require little or no disk space on a client because they can operate within a browser window. Native software, however, is typically stored in a memory of a device on which it runs. To this end, operating system 140 running on client device 102 includes a collection of software that manages hardware resources (e.g., device hardware 150 and data storage 160) and provides common services for native code 110.

A user of client device 102 may interact with native code 110 and/or non-native applications 130a . . . 130n via user interface 120. An example of user interface 120 can be a touch interface for a touchscreen. A touchscreen is an electronic display device that a user can control through gestures by touching the touchscreen with a stylus, pen, and/or one or more fingers (collectively referred to hereinafter as a pointer). For example, in using a native application running on a mobile device such as a smartphone, a user may navigate to the top of a list displayed on the touchscreen of the smartphone by the native application, pull the list down, and then release it. Upon the user releasing the pointer, the native application refreshes the list. This gives the user a quick way to refresh the view displayed by the native application.

Figure 5:
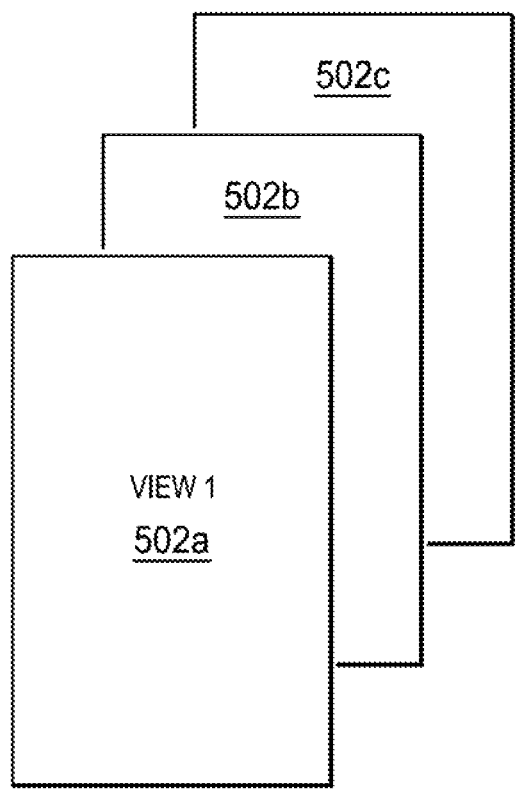
FIG. 5 schematically depicts views associated with a web page according to some embodiments disclosed herein.

As will be discussed in greater detail below, embodiments disclosed herein allow a user to have similar functionality while using the non-native applications, such as while using a web browser to view a web page. An example of a "web page" may be a "single page web application," which may include a plurality of screen views (which may also be referred to as page views or views). With such a single page application, rather than an entire single web page being refreshed in response to a click, a single click hides a current screen view and causes another to slide in its place. For example, referring to FIG. 5, a web page displayed on a device such as a smartphone (not shown) may have a plurality of screen views 502a, 502b, 502c, etc. As will be described in greater detail below, each such screen view may be associated with its own gesture-to-refresh functionality.

Figure 2:
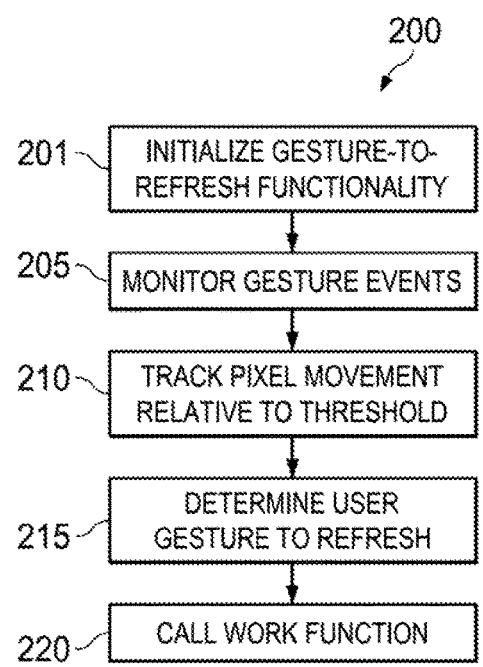
FIG. 2 depicts a flow chart illustrating one example of a method according to some embodiments disclosed herein.

FIG. 2 depicts a flow chart illustrating one example of method 200 according to some embodiments disclosed herein. In some embodiments, a gesture-to-refresh functionality is initialized with a view associated with a page of a non-native application running on a client device (step 201). The non-native application may be written in code that is not native to an operating system executing on the client device. At step 205, gesture events (e.g., touch events, mouse-down events, pointing-device events, etc.) relative to the view presented on a display of the client device may be monitored. In some embodiments, this may be done via listeners configured to receive gesture events from the device hardware (e.g., a touch interface of the client device).

At step 210, a gesture event corresponding to a dragging gesture may be detected and tracked as the view is being dragged from a first position to a second position on the display. In some embodiments, this may be done by tracking pixel movement relative to a predetermined threshold. As a specific example, suppose the display is 320 pixels wide and 480 lines tall, a predetermined threshold may be set at the 70th line relative to an edge of the display. The predetermined threshold is configurable and may depend on the size of the display. When a dragging gesture is detected, the position of a pixel initially located at an edge of the display may be tracked and compared with the predetermined threshold to determine if the view should be refreshed.

In some embodiments, a predetermined threshold may be set as a relative distance between a first position and a second position of a pixel. When a dragging gesture is detected, the second position of the pixel initially located at the first position may be tracked and the distance between the two positions may be compared with the predetermined threshold to determine if the view should be refreshed.

At step 215, the view is refreshed if the pixel movement corresponding to the dragging gesture reaches or exceeds the predetermined threshold. In some embodiments, this may entail calling a work function which is inputted into the gesture-to-refresh functionality when initialized (step 220).

If the pixel movement corresponding to the dragging gesture does not indicate that the view should be refreshed, the view is allowed to return to its normal position upon detecting release of the dragging gesture.

A non-limiting example of pseudo-code for implementing the invention described above is provided below:

```
DOWNLOAD ALL VIEWS OF SINGLE PAGE APPLICATION
PERFORM INITIALIZATION CHECKS:
    INITIALIZE VIEW PARAMETERS
    INITIALIZE VIEW-SPECIFIC GESTURE THRESHOLD
ADD LISTENERS FOR GESTURE EVENTS FOR ALL VIEWS
ON FIRST DETECTION OF GESTURE EVENT, DETERMINE THE
VIEW IN WHICH THE GESTURE EVENT OCCURS (I.E.,
DETERMINE VIEW ID OF ACTIVE VIEW)
IF THIS IS THE VIEW IN WHICH THE GESTURE EVENT OCCURS
    {
    INITIALIZE GESTURE PARAMETERS:
        DETERMINE INITIAL GESTURE POSITION (E.G., Y1 ON
           AXIS Y) ON THE VIEW
        UPDATE USER INTERFACE TO INITIATE GESTURE
TRACKING (E.G., A PULLING GESTURE ASSOCIATED WITH A
MOUSE-DOWN EVENT) IN THE VIEW
    }
WHILE GESTURE EVENT (E.G., MOUSE-DOWN EVENT)
CONTINUES IN THE VIEW {
    UPDATE USER INTERFACE TO REFLECT GESTURE IN THE
       VIEW
    UPDATE GESTURE PARAMETERS:
        DETERMINE CURRENT POSITION (E.G., Y2 ON AXIS Y)
IN THE VIEW
        IF DIFFERENCE BETWEEN INITIAL GESTURE POSITION AND
CURRENT POSITION EXCEEDS VIEW-SPECIFIC GESTURE
THRESHOLD (E.G., PULLDOWN THRESHOLD)
        {
        PERFORM WORK FUNCTION FOR THE VIEW
        UPDATE USER INTERFACE TO EXIT GESTURE-TO-
REFRESH FUNCTIONALITY IN THE VIEW
        RESET GESTURE EVENT PARAMETERS
        }
    } OTHERWISE, CONTINUE WHILE LOOP
ON-GESTURE-RELEASED
    {
    UPDATE USER INTERFACE TO EXIT GESTURE-TO-REFRESH
IN THE VIEW
        RESET GESTURE EVENT PARAMETERS
    }
WORK FUNCTION FOR THE VIEW
{
    DO SOMETHING
}
```

Operation of embodiments and the pseudo-code are explained with reference to process flow 300 of FIG. 3 and one example of a gesture-to-refresh functionality shown in FIG. 4.

Figure 3:
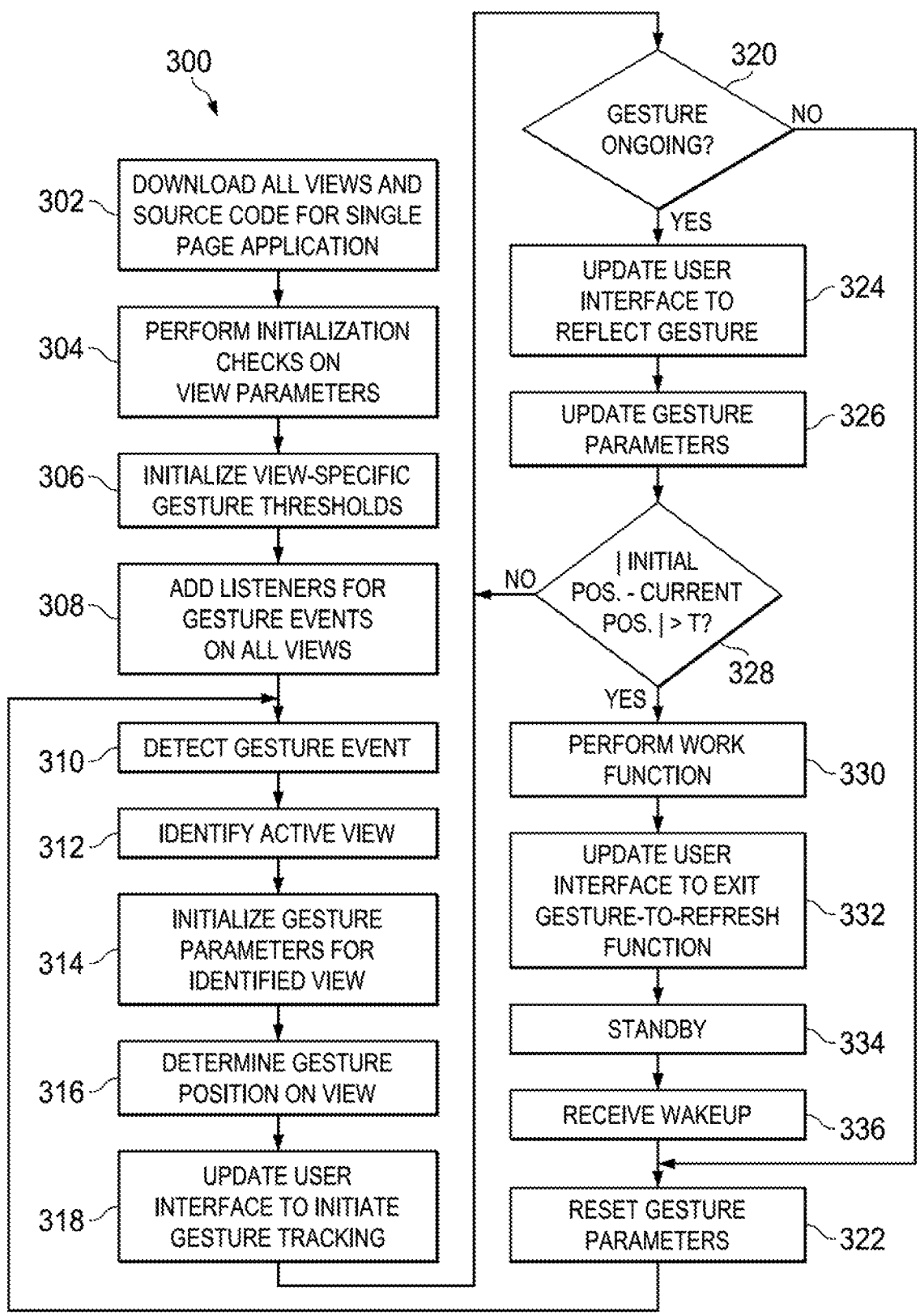
FIG. 3 depicts a flow chart illustrating one example of a method according to some embodiments disclosed herein.

Referring to FIG. 3, when a user accesses a web page of a single page web application on a user device, the user device may download all views and associated source code for the single page web application (step 302). At the same time, code associated with a gesture-to-refresh functionality (e.g., pull down functionality 400) is downloaded to the user device.

As an example, the user device may send a single request to a remote server. In response, the remote server may send a plurality of views to the user device. The user device may load the plurality of views in a web browser. In some embodiments, a view may be determined as an active view based on a predetermined default active view within the plurality of views. In some embodiments, views other than the active view may be disabled when inactive. The web browser may enable the display of a plurality of links, each link corresponding to one of the plurality of views. In response to a selection of one of the links at the user device, the active view may be updated to the view corresponding to the selected link and the previous active view may be disabled.

Figure 4:
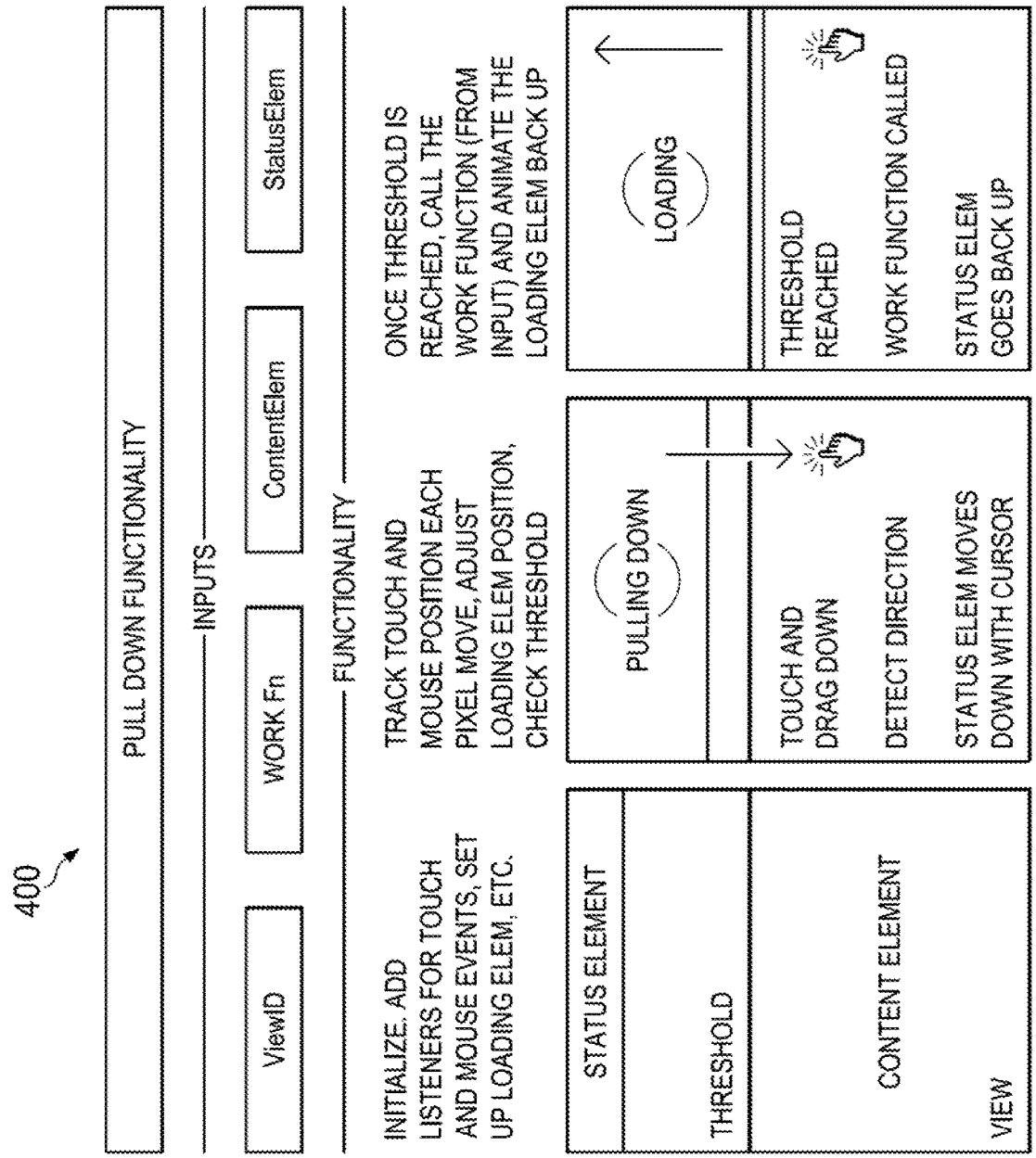
FIG. 4 depicts a functional diagram illustrating one example of a pull down functionality according to some embodiments disclosed herein.

As illustrated in FIG. 4, pull down functionality 400 downloaded to a user device may be configured with a set of input items, including a view identifier (ViewID), a work function (Work Fn), a content element (ContentElem), and a status element (StatusElem). In some embodiments, an instance of pull down functionality 400 is initialized with each view and the input items are passed in to the instance of pull down functionality 400 such that each view gets its own set of input items.

The initialization may include performing initialization checks, such as checking view parameters (step 304). As discussed above, a non-native application running on a client device such as a mobile device can have a plurality of views opened at the same time. Each view has a view identifier that uniquely identifies the view. Each view has an associated work function which is called whenever a view-specific gesture threshold (e.g., a pull-down threshold or dragging threshold) is reached. These view-specific thresholds are initialized when the views are first downloaded (step 306). Pull down functionality 400 associated with a view may add a listener for monitoring gesture events. This is done for all views (step 308). The listeners continuously monitor gesture events such as a mouse-down event, a touch event, a pointing device or stylus dragging event, etc.

In addition to monitoring gesture events, pull down functionality 400 may operate to track a user's gesture positions (e.g., by touch, a mouse, a stylus, or any suitable pointing device) on an active view using gesture events communicated to the listeners. For example, upon detection of a gesture event (step 310), the currently active view is identified (e.g., by determining the view identifier associated with the active view where the gesture event is occurring) (step 312) and gesture parameters for the identified view are initialized accordingly (step 314). In some embodiments, detecting the dragging operation may include: detecting dragging over a computer display for displaying the active page, the computer display coupled to the computer processor, the dragging detected via a computer mouse, a stylus, a touch interface, a pointing device, or the like that is coupled to the computer processor. In some embodiments, detecting the dragging operation may include detecting dragging over a touch-sensitive computer display for displaying the active view, the computer display coupled to the computer processor.

As noted above, in some embodiments, there can be a single active view displayed at a time. Accordingly, pull down functionality 400 may first determine if the view associated with the view identifier passed in at initialization is the active view currently displayed on the mobile device. Again, each view is associated with a view identifier. Thus, determining the active view within the plurality of views may entail determining which view is active based on the view identifier.

Initialization of gesture parameters may include determining the initial gesture position (e.g., a location on the y axis of the active view) on the view (step 316). That is, for the active view, pull down functionality 400 may determine whether the status element is moving or loading based on the tracked positions. As illustrated in FIG. 4, the status element is associated with the data that is being fetched (and that is "grown" when a user pulls down the view), while the content element refers to the content currently displayed in the view.

At this time, the user interface is updated to initiate a gesture tracking loop (step 318). If the gesture terminates (step 320), then the gesture parameters are reset (step 322), and process 300 loops back to monitor for gesture events. Otherwise, the user interface is updated to reflect the gesture (e.g., pulling the view down) (step 324) and gesture parameters are updated accordingly (step 326). If the tracked positions indicate that the status element (or a status portion of the active view) is moving or loading, pull down functionality 400 may determine whether such movement reaches or exceeds a dragging threshold (step 328).

In some embodiments, this may entail comparing a dragging difference (i.e., an offset between the initial gesture position and the current position) to a predetermined dragging threshold and determining whether the dragging difference is greater than or equal to the dragging threshold.

In some embodiments, the dragging operation may occur relative to a computer display having a vertical extent and a horizontal extent, the initial dragging position and the current dragging position determined relative to the vertical extent. In some embodiments, the dragging operation may occur from the top to the bottom of the vertical extent. However, the dragging operation may also occur from the bottom to the top of the vertical extent. Furthermore, the dragging operation may occur relative to a computer display having a vertical extent and a horizontal extent, the initial dragging position and the current dragging position determined relative to the horizontal extent.

If, for example, the difference between an initial position and a current position is less than a predetermined threshold T (step 320), process 300 may continue to monitor the gesture and pull down functionality 400 may reset the status element without refreshing the content element. Otherwise, if the movement reaches or exceeds the dragging threshold T, pull down functionality 400 may call a sub function to refresh the content element (or a content portion of the active page), call the work function (from input) to perform the work function associated with the view, and/or animate the status element being loaded back up to its initial position (step 330). As an example, the work function can be selected from a set of work functions related to a content repository. The work function may be, for example, an update of the view, as will be discussed in greater detail below.

Once the work function is initiated, the user interface is updated to exit pull down functionality 400 (step 332), and may enter a standby state (step 334) to wait for a wakeup call (step 336), whereupon gesture parameters are reset in (step 322) and process 300 loops back to monitor for gesture events. In some embodiments, pull down functionality 400 is only functional/operational when called by an associated client application.

Figure 6:
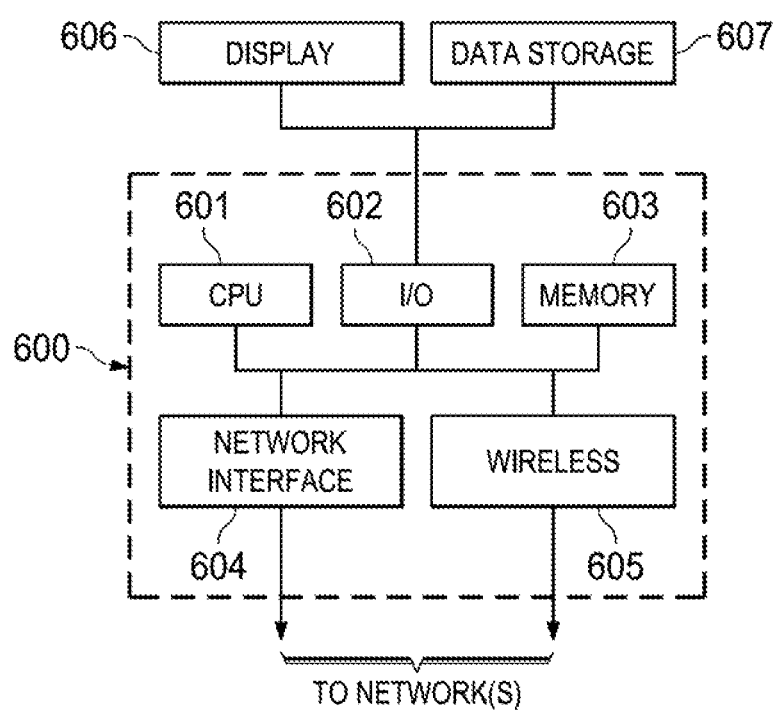
FIG. 6 depicts a diagrammatic representation of one example embodiment of a data processing system that can be used to implement embodiments disclosed herein.

FIG. 6 depicts a diagrammatic representation of one example embodiment of a data processing system that can be used to implement embodiments disclosed herein. As shown in FIG. 6, data processing system 600 may include one or more central processing units (CPU) or processors 601 coupled to one or more user input/output (I/O) devices 602 and memory devices 603. Examples of I/O devices 602 may include, but are not limited to, keyboards, displays, monitors, touch screens, printers, electronic pointing devices such as mice, trackballs, styluses, touch pads, or the like. Examples of memory devices 603 may include, but are not limited to, hard drives (HDs), magnetic disk drives, optical disk drives, magnetic cassettes, tape drives, flash memory cards, random access memories (RAMs), read-only memories (ROMs), smart cards, etc. Data processing system 600 can be coupled to display 606, information device 607 and various peripheral devices (not shown), such as printers, plotters, speakers, etc. through I/O devices 602. Data processing system 600 may also be coupled to external computers or other devices through network interface 604, wireless transceiver 605, or other means that is coupled to a network such as a local area network (LAN), wide area network (WAN), or the Internet.

Those skilled in the relevant art will appreciate that the invention can be implemented or practiced with other computer system configurations, including without limitation multi-processor systems, network devices, mini-computers, mainframe computers, data processors, and the like. The invention can be embodied in a general purpose computer, or a special purpose computer or data processor that is specifically programmed, configured, or constructed to perform the functions described in detail herein. The invention can also be employed in distributed computing environments, where tasks or modules are performed by remote processing devices, which are linked through a communications network such as a LAN, WAN, and/or the Internet. In a distributed computing environment, program modules or subroutines may be located in both local and remote memory storage devices. These program modules or subroutines may, for example, be stored or distributed on computer-readable media, including magnetic and optically readable and removable computer discs, stored as firmware in chips, as well as distributed electronically over the Internet or over other networks (including wireless networks). Example chips may include Electrically Erasable Programmable Read-Only Memory (EEPROM) chips. Embodiments discussed herein can be implemented in suitable instructions that may reside on a non-transitory computer readable medium, hardware circuitry or the like, or any combination and that may be translatable by one or more server machines. Examples of a non-transitory computer readable medium are provided below in this disclosure.

ROM, RAM, and HD are computer memories for storing computer-executable instructions executable by the CPU or capable of being compiled or interpreted to be executable by the CPU. Suitable computer-executable instructions may reside on a computer readable medium (e.g., ROM, RAM, and/or HD), hardware circuitry or the like, or any combination thereof. Within this disclosure, the term "computer readable medium" is not limited to ROM, RAM, and HD and can include any type of data storage medium that can be read by a processor. Examples of computer-readable storage media can include, but are not limited to, volatile and non-volatile computer memories and storage devices such as random access memories, read-only memories, hard drives, data cartridges, direct access storage device arrays, magnetic tapes, floppy diskettes, flash memory drives, optical data storage devices, compact-disc read-only memories, and other appropriate computer memories and data storage devices. Thus, a computer-readable medium may refer to a data cartridge, a data backup magnetic tape, a floppy diskette, a flash memory drive, an optical data storage drive, a CD-ROM, ROM, RAM, HD, or the like.

The processes described herein may be implemented in suitable computer-executable instructions that may reside on a computer readable medium (for example, a disk, CD-ROM, a memory, etc.). Alternatively, the computer-executable instructions may be stored as software code components on a direct access storage device array, magnetic tape, floppy diskette, optical storage device, or other appropriate computer-readable medium or storage device.

Any suitable programming language can be used to implement the routines, methods or programs of embodiments of the invention described herein, including C, C++, Java, JavaScript, HTML, or any other programming or scripting code, etc. Other software/hardware/network architectures may be used. For example, the functions of the disclosed embodiments may be implemented on one computer or shared/distributed among two or more computers in or across a network. Communications between computers implementing embodiments can be accomplished using any electronic, optical, radio frequency signals, or other suitable methods and tools of communication in compliance with known network protocols.

Different programming techniques can be employed such as procedural or object oriented. Any particular routine can execute on a single computer processing device or multiple computer processing devices, a single computer processor or multiple computer processors. Data may be stored in a single storage medium or distributed through multiple storage mediums, and may reside in a single database or multiple databases (or other data storage techniques). Although the steps, operations, or computations may be presented in a specific order, this order may be changed in different embodiments. In some embodiments, to the extent multiple steps are shown as sequential in this specification, some combination of such steps in alternative embodiments may be performed at the same time. The sequence of operations described herein can be interrupted, suspended, or otherwise controlled by another process, such as an operating system, kernel, etc. The routines can operate in an operating system environment or as stand-alone routines. Functions, routines, methods, steps and operations described herein can be performed in hardware, software, firmware or any combination thereof.

Embodiments described herein can be implemented in the form of control logic in software or hardware or a combination of both. The control logic may be stored in an information storage medium, such as a computer-readable medium, as a plurality of instructions adapted to direct an information processing device to perform a set of steps disclosed in the various embodiments. Based on the disclosure and teachings provided herein, a person of ordinary skill in the art will appreciate other ways and/or methods to implement the invention.

It is also within the spirit and scope of the invention to implement in software programming or code an of the steps, operations, methods, routines or portions thereof described herein, where such software programming or code can be stored in a computer-readable medium and can be operated on by a processor to permit a computer to perform any of the steps, operations, methods, routines or portions thereof described herein. The invention may be implemented by using software programming or code in one or more general purpose digital computers, by using application specific integrated circuits, programmable logic devices, field programmable gate arrays, optical, chemical, biological, quantum or nanoengineered systems, components and mechanisms may be used. In general, the functions of the invention can be achieved by any means as is known in the art. For example, distributed, or networked systems, components and circuits can be used. In another example, communication or transfer (or otherwise moving from one place to another) of data may be wired, wireless, or by any other means.

A "computer-readable medium" may be any medium that can contain, store, communicate, propagate, or transport the program for use by or in connection with the instruction execution system, apparatus, system or device. The computer readable medium can be, by way of example only but not by limitation, an electronic, magnetic, optical, electromagnetic, infrared, or semiconductor system, apparatus, system, device, propagation medium, or computer memory. Such computer-readable medium shall generally be machine readable and include software programming or code that can be human readable (e.g., source code) or machine readable (e.g., object code). Examples of non-transitory computer-readable media can include random access memories, read-only memories, hard drives, data cartridges, magnetic tapes, floppy diskettes, flash memory drives, optical data storage devices, compact-disc read-only memories, and other appropriate computer memories and data storage devices. In an illustrative embodiment, some or all of the software components may reside on a single server computer or on any combination of separate server computers. As one skilled in the art can appreciate, a computer program product implementing an embodiment disclosed herein may comprise one or more non-transitory computer readable media storing computer instructions translatable by one or more processors in a computing environment.

A "processor" includes any, hardware system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real-time," "offline," in a "batch mode," etc. Portions of processing can be performed at different times and at different locations, by different (or the same) processing systems.

As used herein, the terms "comprises," "comprising," "includes," "including," "has," "having," or any other variation thereof, are intended to cover a non-exclusive inclusion. For example, a process, product, article, or apparatus that comprises a list of elements is not necessarily limited only those elements but may include other elements not expressly listed or inherent to such process, product, article, or apparatus.

Furthermore, the term "or" as used herein is generally intended to mean "and/or" unless otherwise indicated. For example, a condition A or B is satisfied by any one of the following: A is true (or present) and B is false (or not present), A is false (or not present) and B is true (or present), and both A and B are true (or present). As used herein, a term preceded by "a" or "an" (and "the" when antecedent basis is "a" or "an") includes both singular and plural of such term, unless clearly indicated otherwise (i.e., that the reference "a" or "an" clearly indicates only the singular or only the plural).

Also, as used in the description herein, the meaning of "in" includes "in" and "on" unless the context clearly dictates otherwise.

It will also be appreciated that one or more of the elements depicted in the drawings/figures can also be implemented in a more separated or integrated manner, or even removed or rendered as inoperable in certain cases, as is useful in accordance with a particular application. Additionally, any signal arrows in the drawings/figures should be considered only as exemplary, and not limiting, unless otherwise specifically noted.

Although the present disclosure has been described in detail herein with reference to the illustrative embodiments, it should be understood that the description is by way of example only and is not to be construed in a limiting sense. It is to be further understood, therefore, that numerous changes in the details of the embodiments disclosed herein and additional embodiments will be apparent to, and may be made by, persons of ordinary skill in the art having reference to this description. Accordingly, the scope of the present disclosure should be determined by the following claims and their legal equivalents.

What is claimed is:

1. A method, comprising:
    receiving, by a computing device, a plurality of views of a single page application from a server computer operating in a network;
    initializing, by the computing device, view-specific gesture thresholds for the plurality of views of the single page application such that each of the plurality of views of the single page application is initialized with a view-specific gesture threshold, wherein one of the view-specific gesture thresholds is for thresholding a corresponding view being dragged upwards;
    adding, by the computing device for the plurality of views of the single page application, listeners for gesture events;
    upon detection of a gesture event through one of the listeners, determining, by the computing device from the plurality of views, a view in which the gesture event occurs on a user interface of the computing device, the gesture event indicating a user gesture;
    determining, by the computing device, an initial gesture position of the user gesture in the view determined from the plurality of views;
    initiating gesture tracking which includes, while the gesture event continues in the view:
        updating the user interface to reflect the user gesture in the view;
        determining a current position of the user gesture in the view; and
        determining whether a difference between the initial gesture position and the current position exceeds a view-specific gesture threshold for the view; and
    responsive to the difference between the initial gesture position and the current position exceeding the view-specific gesture threshold for the view, calling a work function for the view and exiting the gesture tracking, the work function associated with a content repository in the network.

2. The method according to claim 1, wherein the plurality of views of the single page application and associated source code are downloaded from the server computer by the computing device responsive to a user accessing a web page of the single page application on the computing device.

3. The method according to claim 2, wherein the source code downloaded from the server computer by the computing device includes code for a gesture-to-refresh functionality for the gesture tracking.

4. The method according to claim 3, wherein the gesture-to-refresh functionality is configured with a set of input items, the set of input items including the work function.

5. The method according to claim 4, further comprising:
    initializing an instance of the gesture-to-refresh functionality for each view of the plurality of views of the single page application; and
    passing the set of input items to the instance of the gesture-to-refresh functionality such that each view of the plurality of views of the single page application has a corresponding set of input items, including the work function associated with the content repository in the network.

6. The method according to claim 1, further comprising:
    sending, by the computing device, a request to the server computer in the network, wherein the plurality of views of the single page application is sent to the computing device in response to the request from the computing device; and
    loading, into a web browser by the computing device, the plurality of views of the single page application received from the server computer.

7. The method according to claim 1, wherein the difference between the initial gesture position and the current position of the user gesture in the view corresponds to a distance of the view being dragged left, right, up, or down by the user gesture.

8. A system, comprising:
    a processor;
    a non-transitory computer-readable medium; and
    stored instructions translatable by the processor for:
        receiving a plurality of views of a single page application from a server computer operating in a network;
        initializing view-specific gesture thresholds for the plurality of views of the single page application such that each of the plurality of views of the single page application is initialized with a view-specific gesture threshold, wherein one of the view-specific gesture thresholds is for thresholding a corresponding view being dragged upwards;
        adding, for the plurality of views of the single page application, listeners for gesture events;
        upon detection of a gesture event through one of the listeners, determining, from the plurality of views, a view in which the gesture event occurs on a user interface of the system, the gesture event indicating a user gesture;
        determining an initial gesture position of the user gesture in the view determined from the plurality of views;
        initiating gesture tracking which includes, while the gesture event continues in the view:
            updating the user interface to reflect the user gesture in the view;
            determining a current position of the user gesture in the view; and
            determining whether a difference between the initial gesture position and the current position exceeds a view-specific gesture threshold for the view; and
        responsive to the difference between the initial gesture position and the current position exceeding the view-specific gesture threshold for the view, calling a work function for the view and exiting the gesture tracking, the work function associated with a content repository in the network.

9. The system of claim 8, wherein the plurality of views of the single page application and associated source code are downloaded from the server computer responsive to a user accessing a web page of the single page application on the user interface.

10. The system of claim 9, wherein the source code downloaded from the server computer includes code for a gesture-to-refresh functionality for the gesture tracking.

11. The system of claim 10, wherein the gesture-to-refresh functionality is configured with a set of input items, the set of input items including the work function.

12. The system of claim 11, wherein the stored instructions are further translatable by the processor for:
   initializing an instance of the gesture-to-refresh functionality for each view of the plurality of views of the single page application; and
   passing the set of input items to the instance of the gesture-to-refresh functionality such that each view of the plurality of views of the single page application has a corresponding set of input items, including the work function associated with the content repository in the network.

13. The system of claim 8, wherein the stored instructions are further translatable by the processor for:
   sending a request to the server computer in the network, wherein the plurality of views of the single page application is sent to the computing device in response to the request from the computing device; and
   loading, into a web browser by the computing device, the plurality of views of the single page application received from the server computer.

14. The system of claim 8, wherein the difference between the initial gesture position and the current position of the user gesture in the view corresponds to a distance of the view being dragged left, right, up, or down by the user gesture.

15. A computer program product comprising a non-transitory computer-readable medium storing instructions translatable by a processor of a computing device for:
   receiving a plurality of views of a single page application from a server computer operating in a network;
   initializing view-specific gesture thresholds for the plurality of views of the single page application such that each of the plurality of views of the single page application is initialized with a view-specific gesture threshold, wherein one of the view-specific gesture thresholds is for thresholding a corresponding view being dragged upwards;
   adding, for the plurality of views of the single page application, listeners for gesture events;
   upon detection of a gesture event through one of the listeners, determining, from the plurality of views, a view in which the gesture event occurs on a user interface of the computing device, the gesture event indicating a user gesture;
   determining an initial gesture position of the user gesture in the view determined from the plurality of views;
   initiating gesture tracking which includes, while the gesture event continues in the view:
      updating the user interface to reflect the user gesture in the view;
      determining a current position of the user gesture in the view; and
      determining whether a difference between the initial gesture position and the current position exceeds a view-specific gesture threshold for the view; and
   responsive to the difference between the initial gesture position and the current position exceeding the view-specific gesture threshold for the view, calling a work function for the view and exiting the gesture tracking, the work function associated with a content repository in the network.

16. The computer program product of claim 15, wherein the plurality of views of the single page application and associated source code are downloaded from the server computer responsive to a user accessing a web page of the single page application on the computing device.

17. The computer program product of claim 16, wherein the source code downloaded from the server computer includes code for a gesture-to-refresh functionality for the gesture tracking.

18. The computer program product of claim 17, wherein the gesture-to-refresh functionality is configured with a set of input items, the set of input items including the work function.

19. The computer program product of claim 18, wherein the instructions are further translatable by the processor for:
   initializing an instance of the gesture-to-refresh functionality for each view of the plurality of views of the single page application; and
   passing the set of input items to the instance of the gesture-to-refresh functionality such that each view of the plurality of views of the single page application has a corresponding set of input items, including the work function associated with the content repository in the network.

20. The computer program product of claim 15, wherein the difference between the initial gesture position and the current position of the user gesture in the view corresponds to a distance of the view being dragged left, right, up, or down by the user gesture.

* * * * *